United States Patent [19]
O'Neel

[11] Patent Number: 5,098,348
[45] Date of Patent: Mar. 24, 1992

[54] DRIVE SPROCKET FOR A CHAIN SAW
[75] Inventor: Timothy H. O'Neel, Milwaukie, Oreg.
[73] Assignee: Blount, Inc., Portland, Oreg.
[21] Appl. No.: 584,348
[22] Filed: Sep. 18, 1990
[51] Int. Cl.⁵ .............................................. F16H 7/06
[52] U.S. Cl. ...................................... 474/157; 30/381
[58] Field of Search ............................... 474/155-158, 474/160; 30/381

[56] References Cited
U.S. PATENT DOCUMENTS

| | | | |
|---|---|---|---|
| 1,671,571 | 5/1928 | Carlson. | |
| 1,930,466 | 10/1933 | Bowman. | |
| 2,000,499 | 5/1935 | Roland | 474/157 X |
| 2,387,064 | 6/1942 | Forrest. | |
| 2,854,294 | 2/1955 | Bannister | 474/156 |
| 3,486,574 | 12/1969 | Baron | 474/156 X |
| 3,659,908 | 5/1972 | Comellas | 474/156 X |
| 4,095,478 | 6/1978 | Rynik. | |
| 4,807,366 | 2/1989 | Masato et al. | 30/381 X |

Primary Examiner—Ramon S. Britts
Assistant Examiner—Roger J. Schoeppel
Attorney, Agent, or Firm—Robert L. Harrington

[57] ABSTRACT

A sprocket including spaced rims with sprocket teeth confined between the rims. The rims cooperatively define a configured periphery with link-supporting arc portions located at the teeth tips and flat sections extended between the arc portions. As a side link approaches the sprocket, the leading lower corner (the toe of the leading footprint) passes over a flat portion to remain out of contact with the sprocket. The following supporting arc portion rotates up into the notch formed in the bottom edge of the side link to support the side link as it travels around the sprocket. The hammering effect of the leading lower corner of the side link impacting the sprocket of prior devices is avoided.

8 Claims, 4 Drawing Sheets

DRIVE SPROCKET FOR A CHAIN SAW

BACKGROUND INFORMATION

1. Field of the Invention

This invention relates to chain saws and in particular it relates to an improved drive sprocket for propelling a saw chain around a guide bar on a chain saw.

2. Background of the Invention

Motorized chain saws utilize a drive sprocket coupled to an output shaft of the drive motor to propel an endless saw chain around an elongate guide bar. Drive sprockets are basically of two different types and the present invention is directed to that type referred to as a rim sprocket.

Saw chain as contemplated herein is an endless sequence of pivotably connected links including alternating center drive links and paired side links. Certain of the side links have outwardly extended cutting portions and are referred to as cutting links. All other side links are referred to as tie straps.

The conventional rim type drive sprocket is circular in side view and has formed pockets open to the periphery and extending radially inward for receiving drive tangs that depend from the center drive links of the saw chain. The outer peripheral edges of the sprocket on either side of the pockets provide spaced rims which support the side links of the saw chain.

The lower section of the side links, whether they are cutter links or tie straps, have the same configured profile. The side links have leading and trailing flat bottom support edges (having reference to the direction of travel) separated by a center notch. These support edges are sometimes referred to as leading and trailing footprints.

The saw chain is entrained, under tension, around the peripheral edge of the elongate guide bar and drive sprocket, and is propelled by the driven drive sprocket engaging the depending tangs of the drive links. The guide bar edge has a center groove in which the depending tangs of the drive links travel to guide the chain as it travels around the bar. The bottom support edges of the side links ride on the side rails on either side of the center groove.

An inconsistency that has been recognized for years is that the saw chain is made up of short rigid links that take the shape of a polygon as the chain travels around the bar ends, whereas the rim sprocket provides a circular support edge for the chain. As the links are directed onto the sprocket, the lower front corner (the toe portion of the leading footprint) of each side link initially engages the circular support surface of the rim. As rotation progresses, the link rocks backward and in the process slides the point of engagement across the bottom edge of the leading footprint until the inner corners of both footprints (heel and toe portions, respectively) are engaged and supported on the sprocket rim.

This procedure causes several problems. As the side links rock, the connecting rivets rise and fall and the tension in the chain is varied. Because the chain is travelling at extremely high speeds (reaching upwards of 70 miles per hour), the initial engagement of the side links with the sprocket becomes a rapidly repetitive hammering that accelerates wearing of both the side links and sprocket.

Previous attempts to conform the sprocket shape to the polygon configuration in order to alleviate this hammering effect have included providing a polygon configured rim sprocket that was matched to the polygonal shape of the side links when forced into a curve. A flat side of the sprocket would rotate under each side link and provide a rigid flat surface for supporting the footprints. However, very little improvement was experienced with this arrangement. The failure of these prior attempts was believed to be due to the failure to recognize that the sprocket generates a circular path regardless of its peripheral configuration whereas the rigid links are converting from a straight line of travel to a curved line of travel. The same hammering and rocking of the link takes place in that the side link first engages and is then forcefully pivoted into position around the sprocket.

BRIEF DESCRIPTION OF THE INVENTION

The preferred embodiment of the present invention provides a polygon configured rim sprocket. But in the present invention, the rotating flats are matched to the side links so that the corners between the flats are rotated under the side links, rather than the flats being rotated under the side links. The corners of the polygon support the side links in a manner similar to the support provided by the prior circular rims. The difference is that the flat edges provide areas of relief at the point where previously the side link corners engaged the sprocket periphery. The polygon corners simply rotate under and into the side link notches with the preceding flats providing a relief area at that portion of the rim that would otherwise be impacted by the side link corner. This relationship largely obviates the hammering effect and reduces the tension variation.

The invention and its benefits will be more clearly understood with reference to the following detailed description and drawings.

DESCRIPTION OF THE PREFERRED EMBODIMENT

Figure 1:
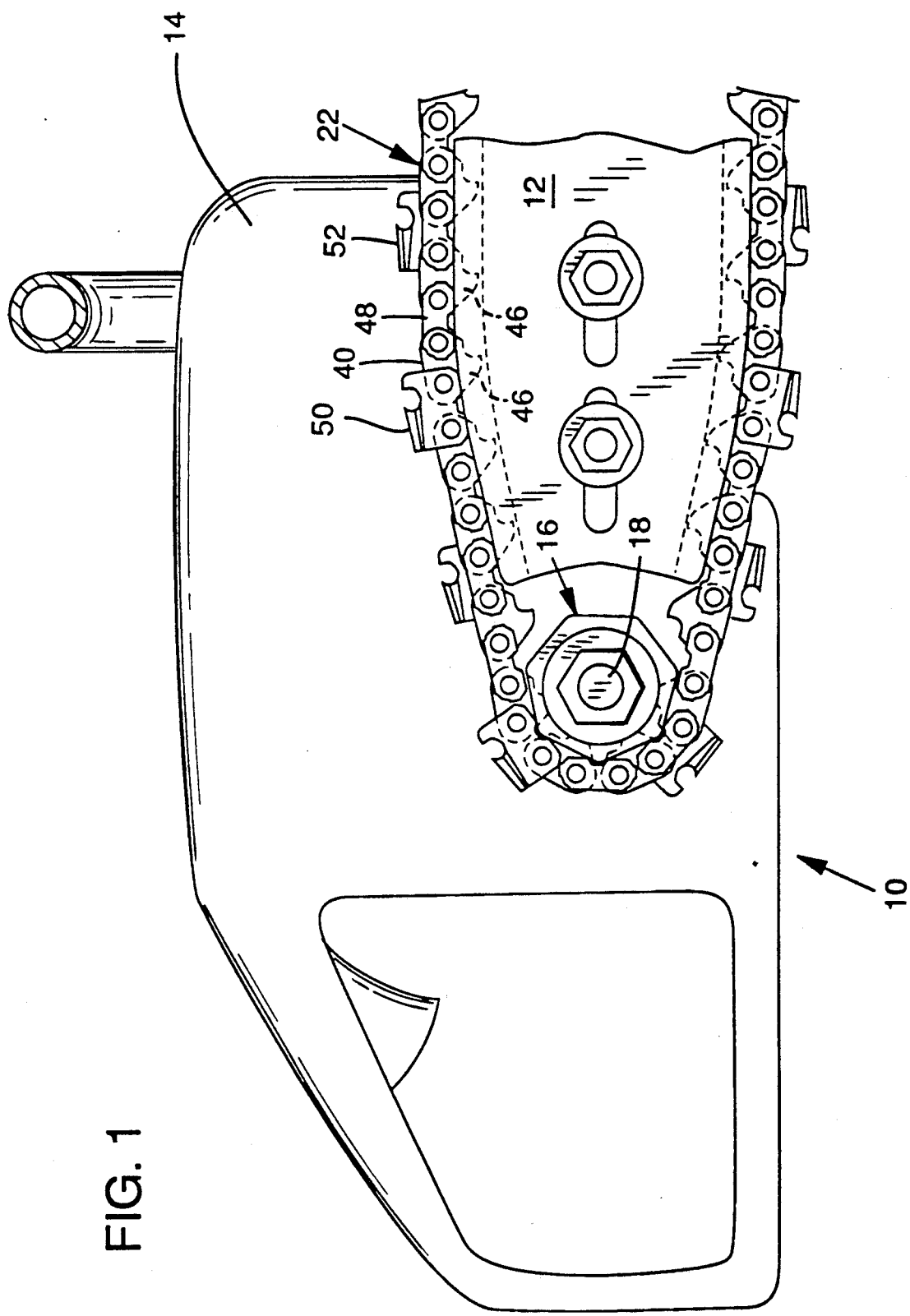
FIG. 1 is a view of a chain saw incorporating an improved drive sprocket of the present invention.

As illustrated in the drawings, a motorized chain saw 10 includes an elongate guide bar 12 adjustably mounted on a housing 14. The guide bar 12 is aligned with a drive sprocket 16 that is coupled to an output shaft 18 of the saw 10. An endless articulated saw chain 22 is entrained around the guide bar 12 and the drive sprocket 16.

The coupling of the drive sprocket 16 to the output shaft of the chain saw 10 is well known to the art and therefore the mounting detail is not shown. As with other rim type drive sprockets, the internal grooves 20 of the drive sprocket 16 mate with male splines of a drive hub on a centrifugal clutch in a known conventional manner.

Figure 2:
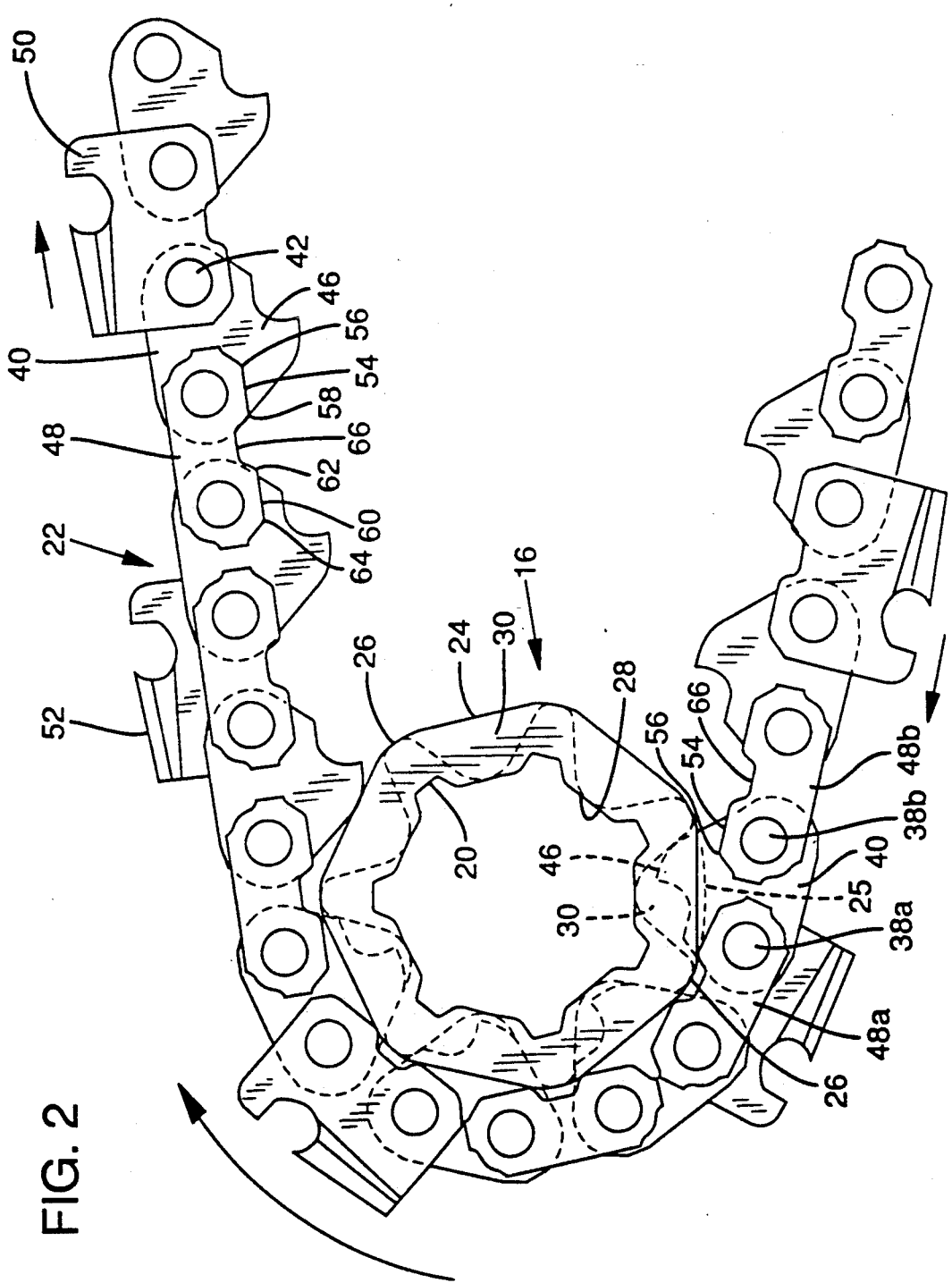
FIG. 2 is a view of the drive sprocket and saw chain illustrating a side link of the saw chain about to engage the drive sprocket.
Figure 3:
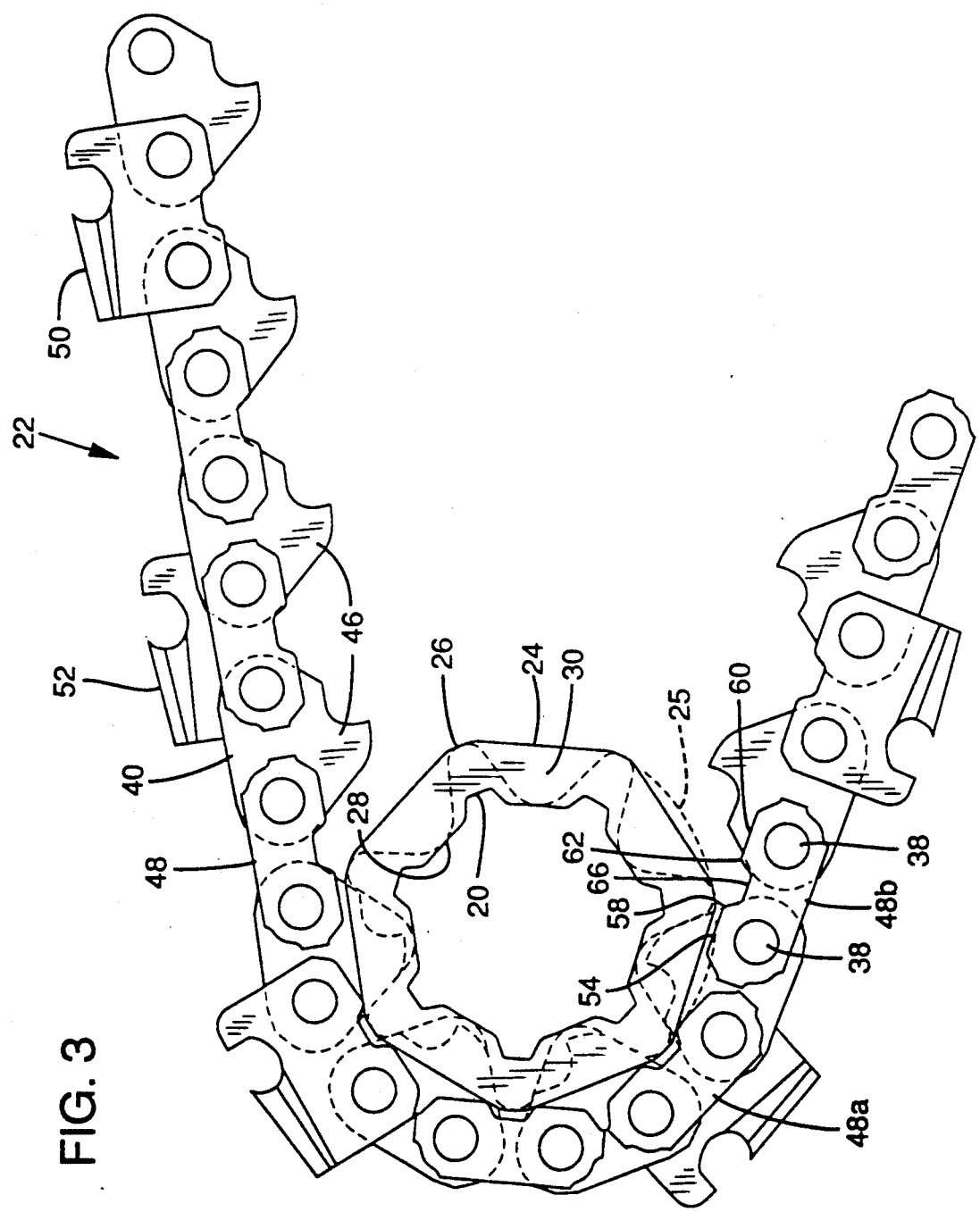
FIG. 3 is a view of the drive sprocket and saw chain of FIG. 2 with the side link referred to making its initial contact with the drive sprocket.
Figure 4:
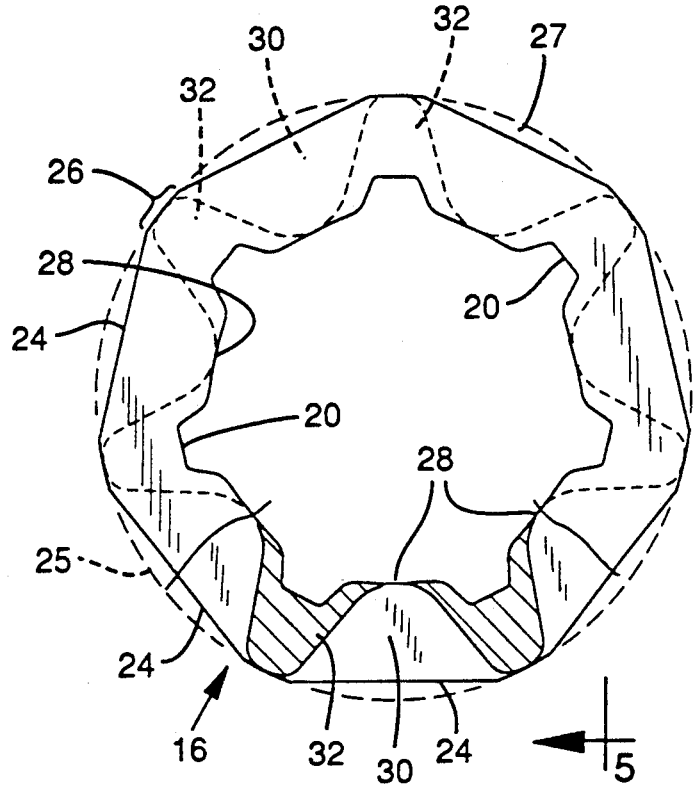
FIG. 4 is an enlarged side view of the drive sprocket only of FIGS. 1-3.

As viewed from the side in FIGS. 2, 3 and 4, the sprocket 16 of the invention is the shape of a polygon. The sprocket 16 has on its periphery, seven sides 24 of equal length, angularly positioned at equal radial distances from the center of the sprocket, i.e. it is symmetrical relative to the sprocket center. The ends of each of the sides 24 are connected to an adjacent side 24 by a connecting arc 26. The sides 24 are chords of a circle, the circle having the same center point and radius as the connecting arcs 26. The sprocket 16 has a center through bore 28. Formed female grooves 20 are formed in the sprocket 16 surrounding the bore 28.

Figure 5:
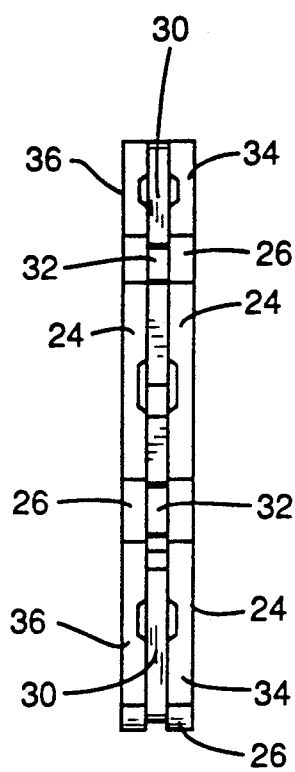
FIG. 5 is an edge view of the drive sprocket as taken on view lines 5—5 of FIG. 4.

Refer now also to FIG. 5 of the drawings. The sprocket 16 is basically constructed of two spaced parallel rims 34, 36 and sprocket teeth 32 confined between the rims. Receiving pockets 30 of a size and shape to receive the drive tangs 46 of the center drive links 40 of the saw chain 22 are formed in the sprocket 16 between the rims 34, 36 and teeth 32. The pockets extend radially inward from the sides 24 and intersect with the center through bore 28. As shown in FIG. 5, the pockets 30 are centrally positioned relative to the width of the sprocket, having a sufficient width to receive the width of the drive tangs 46 of center links 40. A support rim 34 is thus provided on one side of each pocket 30 on the sprocket periphery and a rim 36 on the other side. The flat sides 24 and the connecting arcs 26, thus cooperatively determine the periphery of the sprocket 16.

FIG. 4 provides a comparison as between the sprocket of the present invention and the prior circular sprocket illustrated as dash line 25. The flat sides 24 of the present sprocket are joined together by curved connecting corners or arcs 26. The arcs 26 all coincide with arc segments of circle 25. Thus, as compared to the prior circular rim sprocket, the present sprocket 16 is relieved to the extent of the areas 27, i.e. the difference between the full circle of dash line 25 and the underlying flat sides 24.

Figure 6:
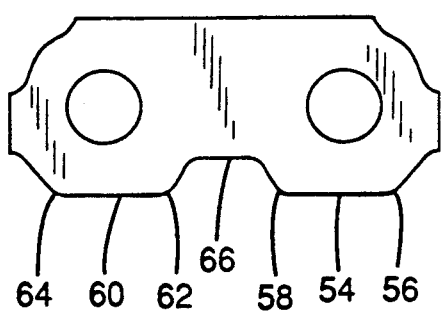
FIG. 6 is a side view of a side link.

The endless saw chain as previously described is comprised of alternating center links 40 and pairs of side links (either pairs of tie straps 48 or a tie strap 48 and an opposed cutter link 50, 52). In any event, the lower body portion of all of the side links are similar and are configured as illustrated in FIG. 6. The pivotal coupling or connection between the side links and center drive links is provided by rivets 38.

As particularly noted in FIG. 6, the bottom edge configuration of the side links include a leading footprint 54 and a trailing footprint 60. The leading footprint 54 has a leading toe portion 56 and a heel 58. The trailing footprint 60 has corresponding toe and heel portions 62, 64, respectively.

Operation of the System

Reference is now made to FIGS. 2 and 3 for discussion of the manner of operation of the present drive sprocket. FIG. 2 illustrates a tie strap 48a seated on a connecting arc or corner 26 of the sprocket periphery and a following tie strap 48b approaching the sprocket periphery. The rear rivet 38a of the tie strap 48a is moving in a direction dictated by its arc of movement about the axis of the sprocket. This arc of movement is essentially in line with the following straight reach of chain, and accordingly, the tie strap 48b is being drawn essentially in a straight line toward the sprocket periphery.

At this point, it will be helpful to envision the action of the prior circular sprocket by reference to the dash line 25 superimposed onto the sprocket 16 in the area of engagement by side link 48b in both FIGS. 2 and 3. Note that the toe 56 of footprint 54 would impact the surface 25 and be forced out of its directed travel path. (Note that this leading lower corner or toe 56 is projected through the dash line in FIG. 3.) The forward rivet 38b of link 48b thus would be forced radially outwardly from the sprocket center, which action increases the tension in the chain. The side link would then rock back as the sprocket continues on a circular path around the sprocket center until the periphery of the sprocket enters the notch 66 to support the heel and toe (56 and 62) of the front and rear footprints (54, 60).

Now consider the action of this same side link 48b being directed onto the present sprocket having relieved areas 27. The toe 56 continues in a straight line (through arc 25) without ever engaging the sprocket periphery. The corner or connecting arc 26 simply moves into the notch 66 with little more than a rolling action as the corner 26 engages the heel 58 and toe 62 of footprints 54, 60.

The provision of the relieved areas 27 on the sprocket periphery substantially increases the life of the sprocket. The hammering effect that undesirably accelerated wear of prior sprocket-saw chain action has been largely eliminated. The oscillating action of the side link has been reduced and a more even chain tension can be achieved.

The benefit of the invention is believed largely due to the result of the strategically located peripheral relief areas 27. The relief areas enable the toe of the leading footprint to project through the circular path generated by the sprocket periphery which in the prior rim sprockets was considered with the sprocket periphery, e.g. periphery 25. Other configurations are possible and the flat segments are believed preferable primarily for manufacturing purposes. Thus, the scope of the invention is not limited to the embodiment disclosed but is encompassed by the definition of the claims appended hereto.

What is claimed is:

1. In a chain saw, a rotatably driven sprocket for driving an endless chain, said chain comprising pivotally connected side link and center links in alternating sequence, portions of said center links having a depending tang and portions of said side links having a lower edge including a leading and trailing footprint, said leading footprint having a forward toe portion and said trailing footprint having a rearward heel portion, the drive sprocket comprising;

parallel spaced rim members and spaced radially directed teeth confined between the rim members, the spaced teeth forming peripheral pockets between the rim members to receive the tangs of the center links in the chain, said rim members each having correspondingly configured peripheral edges, said teeth terminating in teeth tips substantially at peripheral support edges of the rims, said peripheral support edges at said position of termination of the teeth tips providing support portions which are the radially outermost positions of the peripheral edges, with remainder portions of the peripheral edges between said teeth tips being relieved portions spaced radially closer to the central axis of the sprocket than said support portions, and said sprocket and said saw chain mated on said chain saw whereby the support edges of said rim members underlie and support the side links at an intermediate position between said toe portion and said heel portion and whereby said relieved portions of said rim members underlie the toe portion of the side links.

2. In a chain saw, a rotatably driven sprocket for a chain saw, said sprocket being positioned at one end of the guide bar for driving an endless saw chain, said saw chain comprising pivotally connected side links and center links in alternating sequence, portions of said center links having a depending tang and portions of said side links having a lower edge including a leading and trailing footprint separated by an intermediate notch, said footprints having a forward toe portion and a rearward heel portion, the drive sprocket comprising:

parallel spaced rim members and spaced radially directed teeth confined between the rim members, the spaced teeth forming peripheral pockets between the rim members to receive the tangs of the center links in the chain, said rim members each having correspondingly configured peripheral edges, said teeth terminating in teeth tips substantially at peripheral support edges of the rims, said peripheral support edges at said position of termination of the teeth tips providing support portions which are the radially outermost positions of the peripheral edges, with remainder portions of the peripheral edges between said teeth tips being relieved portions spaced radially closer to the central axis of the sprocket than said support portions, and said sprocket and said saw chain mated on said chain saw whereby the support edge of said rim members are aligned with the notches and engage and support the side links at the heel and toe portions of the leading and trailing footprints respectively, and whereby the said relieved portions of said rim members underlie the toe portion of the leading footprint of said side links.

3. In a chain saw rotatably driven sprocket for a chain saw, said sprocket being positioned at one end of a guide bar for driving an endless saw chain onto and around the guide bar and back onto the sprocket, said saw chain comprising pivotally connected center drive links and paired side links, the center links having a depending tang and the side links having a lower edge including a leading and a trailing footprint separated by an intermediate notch, said footprints having a forward toe portion and a rearward heel portion, and the drive sprocket comprising:

parallel spaced rim members and spaced radially directed teeth confined between the rim members, the spaced teeth forming peripheral pockets between the rim members to receive the tangs of the center links, said rim members each having a correspondingly configured peripheral edge, said teeth terminating in teeth tips substantially at the peripheral edges of the rims, said peripheral edges at said position of termination of the teeth tips providing support portions which are the radially outer most positions of the peripheral edges, said support portions defining a circular path as the sprocket is rotatably driven and said configured peripheral edges having relieved portions between the support portions, and said sprocket and said saw chain mated whereby the support portions of said rim members are aligned with the notches of the side links and provide initial contact with the side links of the saw chain at the heel and toe portions of the leading and trailing footprints respectively as the saw chain is directed off the guide bar and onto the drive sprocket.

4. A rotatably driven sprocket as defined in claim 3 wherein the relieved portions of the rim members are straight segments extending between the support portions.

5. A rotatably driven sprocket as defined in claim 4 wherein the support portions are curved segments of a circle coincident with the circular path, the curved segments supporting the side links by engagement at the heel and toe portions respectively of the front and rear footprints of each side link.

6. A saw chain drive system for a chain saw comprising:

a guide bar having an edge that extends from one bar end to and around the other bar end and back to said one end defining thereby an oval travel path, said edge provided with a center groove between a pair of side rails, a drive sprocket positioned at said one bar end and an endless loop of saw chain entrained on said bar and sprocket adapted to be driven by said sprocket onto and around said oval path of travel and back onto said sprocket, said saw chain including center drive links having depending tangs guided in the groove of the bar and side links having bottom support edges supported on the bar side rails, said bottom support edges of the side links configured to have leading and trailing footprints and an intermediate notch, and said footprints having toe and heel portions, said drive sprocket including spaced parallel rims cooperatively defining a peripheral edge, radially directed teeth confined between the rims and extending from a central region to an exterior position adjacent the peripheral edge defined by the rims, the portions of the peripheral edge adjacent the teeth exterior positions providing support portions which are the radially outermost portions of the peripheral edge, said support portions defining a circular path as the sprocket is rotatively driven, and the portions of the rim periphery preceding said support portions being relieved radially inwardly of said path, said drive sprocket and saw chain mated whereby as the side links are directed onto said sprocket, the toe portion of the leading footprint of a side link passes through the circular path above a relieved portion of the peripheral edge so that contact of the side links with the sprocket is confined to the support portions of the peripheral edge.

7. A saw chain drive system as defined in claim 6 wherein the support portions are segments that project into the notch of the side links for contacting the toe and heel portions of the leading and trailing footprints respectively.

8. A saw chain drive system as defined in claim 7 wherein the relieved portions are flat segments extending between the arc segments of the support portions.

* * * * *